US012380312B2

(12) United States Patent
Jiang et al.

(10) Patent No.: US 12,380,312 B2
(45) Date of Patent: Aug. 5, 2025

(54) MULTI-TASK NEURAL NETWORK BY MICRO-STRUCTURED PARAMETER SHARING FOR MULTI-QUALITY LOOP FILTER

(71) Applicant: TENCENT AMERICA LLC, Palo Alto, CA (US)

(72) Inventors: Wei Jiang, Sunnyvale, CA (US); Wei Wang, Palo Alto, CA (US); Sheng Lin, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 967 days.

(21) Appl. No.: 17/500,339

(22) Filed: Oct. 13, 2021

(65) Prior Publication Data
US 2022/0222505 A1     Jul. 14, 2022

Related U.S. Application Data

(60) Provisional application No. 63/135,994, filed on Jan. 11, 2021.

(51) Int. Cl.
*G06N 3/04*     (2023.01)
*G06N 3/082*     (2023.01)

(52) U.S. Cl.
CPC ............... *G06N 3/04* (2013.01); *G06N 3/082* (2013.01)

(58) Field of Classification Search
CPC .......... G06N 3/04; G06N 3/082; G06N 3/045; G06N 3/084; G06V 10/82; H04N 19/117;
(Continued)

(56) References Cited

U.S. PATENT DOCUMENTS 10,354,122 B1*   7/2019   He ..................... G06F 18/241
2020/0120340 A1*   4/2020   Park ..................... H04N 19/105
(Continued)

FOREIGN PATENT DOCUMENTS

KR    10-2019-0067107 A    6/2019
WO    2019/197712 A1    10/2019

OTHER PUBLICATIONS

Mallya, Arun, et al. "Piggyback: Adapting a Single Network to Multiple Tasks by Learning to Mask Weights." arXiv preprint arXiv:1801.06519 (2018), pp. 1-16 (Year: 2018).*

(Continued)

*Primary Examiner* — Omar F Fernandez Rivas
*Assistant Examiner* — Michael C. Lee
(74) *Attorney, Agent, or Firm* — Sughrue Mion, PLLC (57) ABSTRACT

Video processing with a multi-quality loop filter using a multi-task neural network is performed by at least one processor and includes generating a first set of masked weight parameters, based on an input and a plurality of quantization parameter values with a corresponding first set of masks and first plurality of weight parameters, for a first set of shared neural network layers, selecting a second set of task specific neural network layers for the plurality of quantization parameter values with a second plurality of weight parameters, based on the plurality of quantization parameter values, computing an inference output, based on the first set of masked weight parameters and the second plurality of weight parameters, and outputting the computed inference output as an enhanced result.

15 Claims, 8 Drawing Sheets

(58) Field of Classification Search
CPC .... H04N 19/146; H04N 19/176; H04N 19/82; H04N 19/86; H04N 19/124
See application file for complete search history.

(56) References Cited

U.S. PATENT DOCUMENTS

| | | | |
|---|---|---|---|
| 2021/0089922 A1* | 3/2021 | Lu | G06N 3/04 |
| 2021/0241110 A1* | 8/2021 | Calmon | G06N 3/082 |
| 2022/0067527 A1* | 3/2022 | Xu | G06N 3/063 |

OTHER PUBLICATIONS

Mancini, Massimiliano, et al. "Adding New Tasks to a Single Network with Weight Transformations using Binary Masks." arXiv preprint arXiv:1805.11119 (2018), pp. 1-17 (Year: 2018).*

Hung, Steven CY, et al. "Compacting, Picking and Growing for Unforgetting Continual Learning." arXiv preprint arXiv:1910.06562 (Oct. 30, 2019), pp. 1-12 (Year: 2019).*

Matsumoto, Asato, et al. "Continual learning of image translation networks using task-dependent weight selection masks." Springer International Publishing, 2020, pp. 129-142 (Year: 2020).*

Ye, Keren, et al. "SpotPatch: Parameter-efficient transfer learning for mobile object detection." Proceedings of the Asian Conference on Computer Vision. 2020, pp. 1-18 (Year: 2020).*

Extended European Search Report dated May 19, 2023 in Application No. 21918028.8.

Ming-Ze Wang et al., "Attention-Based Dual-Scale CNN In-Loop Filter for Versatile Video Coding", IEEE Access, Sep. 30, 2019, vol. 7, pp. 145214-145226 (13 total pages).

Yat Hong Lam et al., "Compressing Weight-updates for Image Artifacts Removal Neural Networks", Arxiv.org, Jun. 14, 2019, pp. 4321-4325 (5 total pages).

International Search Report dated Jan. 25, 2022 in International Application No. PCT/US21/55036.

Written Opinion of the International Searching Authority dated Jan. 25, 2022 in International Application No. PCT/US21/55036.

* cited by examiner

MULTI-TASK NEURAL NETWORK BY MICRO-STRUCTURED PARAMETER SHARING FOR MULTI-QUALITY LOOP FILTER

CROSS-REFERENCE TO RELATED APPLICATION

This application is based on and claims priority to U.S. Provisional Patent Application No. 63/135,994, filed on Jan. 11, 2021, the disclosure of which is incorporated by reference herein in its entirety.

BACKGROUND

Traditional video coding standards, such as the H.264/Advanced Video Coding (H.264/AVC), High-Efficiency Video Coding (HEVC) and Versatile Video Coding (VVC) share a similar (recursive) block-based hybrid prediction/transform framework where individual coding tools like the intra/inter prediction, integer transforms, and context-adaptive entropy coding, are intensively handcrafted to optimize the overall efficiency. The spatiotemporal pixel neighborhoods are leveraged for predictive signal construction, to obtain corresponding residuals for subsequent transform, quantization, and entropy coding. On the other hand, the nature of Neural Networks (NN) is to extract different levels of spatiotemporal stimuli by analyzing spatiotemporal information from the receptive field of neighboring pixels. The capability of exploring high nonlinearity and nonlocal spatiotemporal correlations provide promising opportunity for largely improved compression quality.

In lossy video compression, the compressed video inevitably suffers from compression artifacts, which severely degrade the Quality of Experience (QoE). The amount of distortion tolerated in practice depends on the applications, and in general, the higher the compression ratio, the larger the distortion. There are many ways to control the compression quality. For example, the Quantization Parameter (QP) determines the quantization step size. The larger the QP value, the larger the quantization step size, and the larger the distortion. To accommodate different requests of users, the video coding method needs the ability to compress videos with different compression qualities. For example, VVC allows the QP value to vary between 0 and 63.

SUMMARY

According to embodiments, a method of multi-quality loop filter video compression using a masked multi-task neural network, based on micro-structured parameter sharing is performed by at least one processor and includes generating a first set of masked weight parameters, based on an input and a plurality of quantization parameter values with a first set of masks and first plurality of weight parameters, for a first set of layers in a neural network, selecting a second set of layers of the neural network for the plurality of quantization parameter values with a second plurality of weight parameters, based on the plurality of quantization parameter values, and computing and outputting a inference output, based on the first set of masked weight parameters and the second plurality of weight parameters.

According to embodiments, an apparatus of multi-quality loop filter video compression using a masked multi-task neural network based on micro-structured parameter sharing includes at least one memory configured to store program code, and at least one processor configured to read the program code and operate as instructed by the program code. The program code includes generating code configured to cause the at least one processor to generate a first set of masked weight parameters, based on an input and a plurality of quantization parameter values with a first set of masks and first plurality of weight parameters, for a first set of layers of a neural network, first selecting code configured to cause the at least one processor to select a second set of layers of the neural network for the plurality of quantization parameter values with a second plurality of weight parameters, based on the plurality of quantization parameter values, computing code configured to cause the at least one processor to compute a inference output, based on the first set of masked weight parameters and the second plurality of weight parameters; and outputting code configured to cause at least one processor to output the computed inference output.

According to embodiments, a non-transitory computer-readable medium storing instructions that, when executed by at least one processor for processing a video with a multi-quality loop filter using a multi-task neural network, cause the at least one processor to generate a first set of masked weight parameters, based on an input and a plurality of quantization parameter values with a first set of masks and first plurality of weight parameters, for a first set of layers of a neural network, select a second set of layers of the neural network for the plurality of quantization parameter values with a second plurality of weight parameters, based on the plurality of quantization parameter values, compute a inference output, based on the first set of masked weight parameters and the second plurality of weight parameters, and output the computed inference output.

DETAILED DESCRIPTION

Deep Neural Network (DNN) based methods have been developed to successfully enhance the visual quality of compressed video, such as: video denoising, super-resolution, deblurring, deblocking, etc. However, it has been a challenging issue for NN-based quality enhancement methods to accommodate multiple QPs. Traditionally, each QP value is treated as an individual task and one NN model instance is trained and deployed for each QP value. It is important to decrease the storage and computation costs caused by multiple QP values.

Given a set of p QP values $qp_1, \ldots qp_p$, one solution is to treat all p values as one set without distinguishing them, and therefore train one NN model instance for all p values by combining training data of different QP values. An improved solution is to use the QP value $qp_i$ as additional input of the NN model and train one NN model instance with the combined training data of different QP values. By using the QP values as inputs, one hopes that the NN model instance automatically learns to organize its parameters to implicitly model distribution of sub-groups of data samples, one corresponding to each QP value.

Embodiments may relate to a Multi-Quality Loop Filter (MQLF) mechanism by using a Multi-Task Neural Network (MTNN) based on micro-structured parameter sharing. One MTNN model instance is used to accommodate multiple QP values, where a binary Micro-Structured Mask (MSM) is associated with each QP value to explicitly guide the inference computation of the MTNN for that QP value.

Accordingly, embodiments of the present disclosure may describes a method and an apparatus using the Multi-Quality Loop Filter (MQLF) mechanism for processing a decoded video to reduce one or more types of artifacts such as noises, blur, and blocky effects. The Multi-Task Neural Network (MTNN) based on micro-structured parameter sharing is proposed, where one MTNN model instance is used to accommodate multiple Quantization Parameter (QP) values, with one Micro-Structured Mask (MSM) assigned to each QP value to explicitly guide the inference computation of the MTNN for that QP value.

Figure 1:
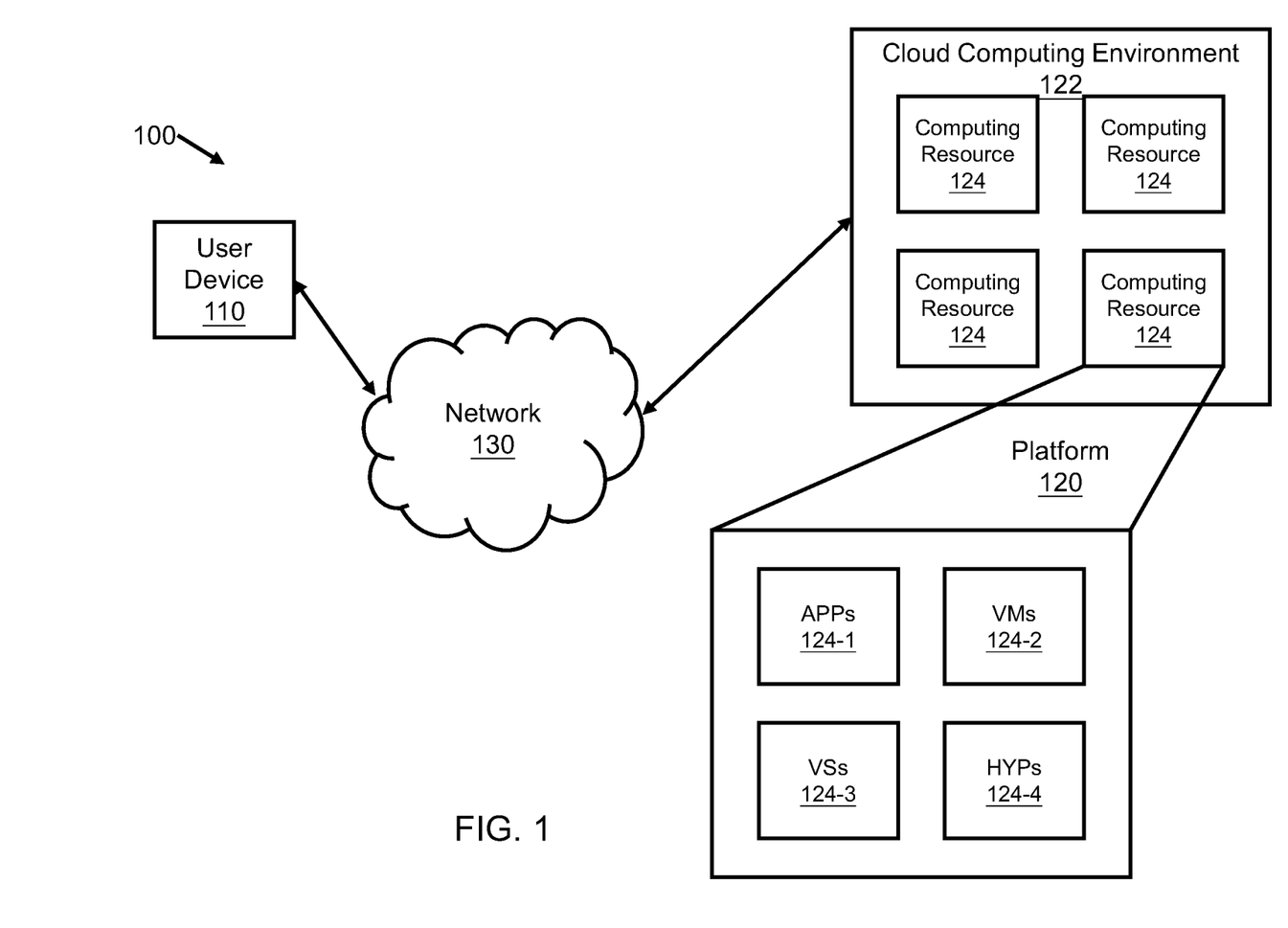
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
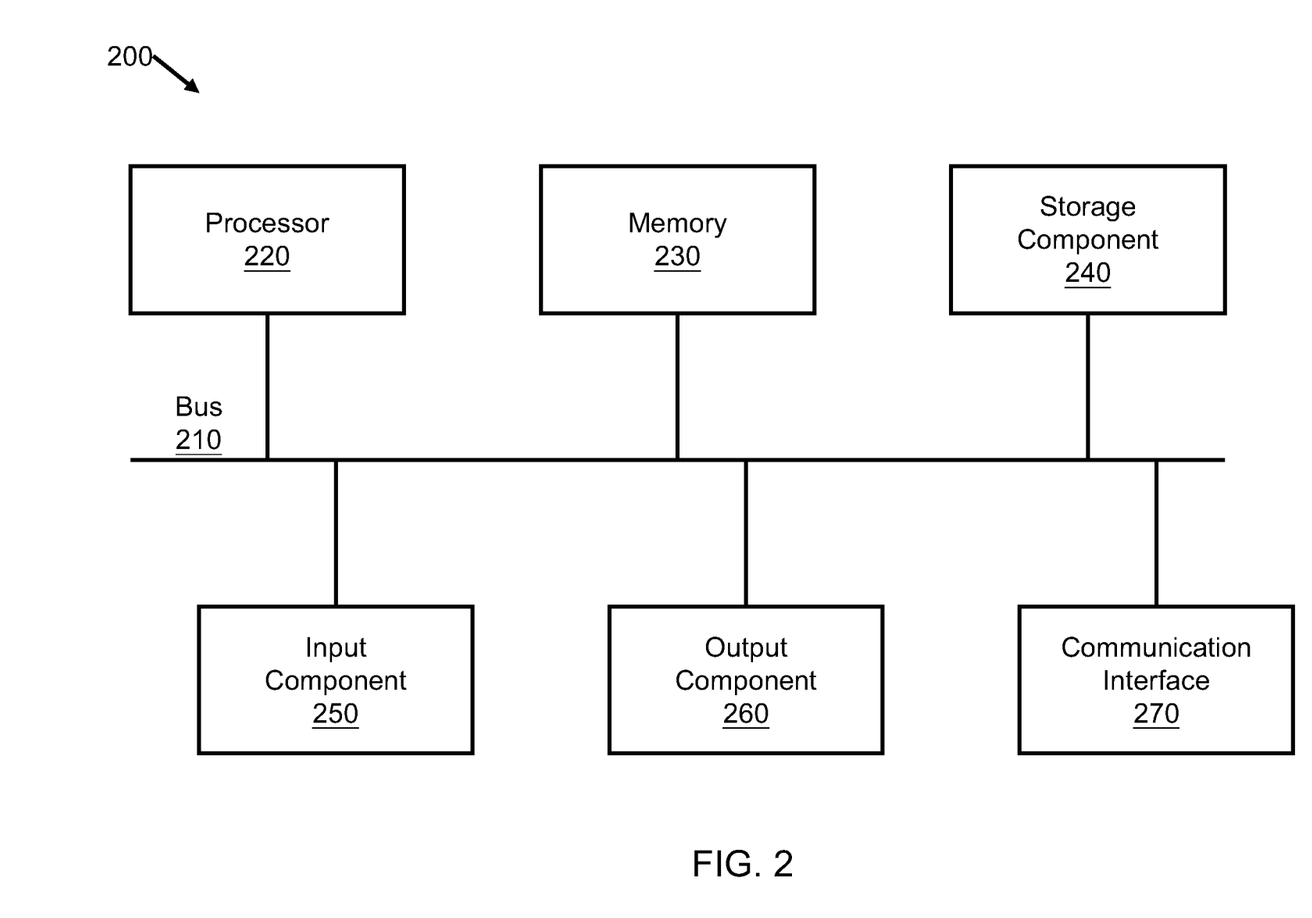
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

A method and an apparatus for multi-quality loop filter video compression using a masked multi-task neural network based on micro-structured parameter sharing will now be described in detail.

A typical video compression framework can be described as follows. Assume an input video x comprises of a plurality of image frames $x_1, \ldots, x_T$. In the first motion estimation step, the frames are partitioned into spatial blocks, each block can be partitioned into smaller blocks iteratively, and a set of motion vectors $m_t$ between a current frame $x_t$ and a set of previous reconstructed frames $\{\hat{x}_j\}_{t-1}$ is computed for each block. Note that the subscript t denotes the current t-th encoding cycle, which may not match the time stamp of the image frames. Also, previous reconstructed frames $\{\hat{x}_j\}_{t-1}$ contain frames from multiple previous encoding cycles. Then, in the second motion compensation step, a predicted frame $\tilde{x}_t$ is obtained by copying the corresponding pixels of the previous reconstructed frames $\{\hat{x}_j\}_{t-1}$ based on the motion vectors $m_t$, and a residual $r_t$ between the original frame $x_t$ and the predicted frame $\tilde{x}_t$. In the third step, the residual $r_t$ is quantized (typically after a transformation like DCT where the DCT coefficients of $r_t$ are quantized to achieve better quantization performance). The quantization step results in a quantized frame $\hat{y}_t$. Both the motion vectors $m_t$ and the quantized frame $\hat{y}_t$ are encoded into bit steams by entropy coding, which are sent to decoders. Then on the decoder side, the quantized frame $\hat{y}_t$ is dequantized (typically through inverse transformation like IDCT with the dequantized coefficients) to obtain a recovered residual $\hat{r}_t$. Then, the recovered residual $\hat{r}_t$ is added back to the predicted frame $\tilde{x}_t$ to obtain the reconstructed frame $\hat{x}_t$.

Additional components are further used to improve the visual quality of the reconstructed frame $\hat{x}_t$. One or multiple of the following enhancement modules may be selected to process the reconstructed frame $\hat{x}_t$, including: a Deblocking Filter (DF), a Sample-Adaptive Offset (SAO), an Adaptive Loop Filter (ALF), a Cross-Component Adaptive Loop Filter (CCALF), etc. The processing order of the selected modules is not limited to this and can change.

Embodiments of this disclosure propose a MQLF for enhancing the visual quality of the reconstructed frame $\hat{x}_t$. The target is to reduce artifacts such as noises, blur, blocky effects in reconstructed frame $\hat{x}_t$, resulting in a high-quality frame $\hat{x}_t^h$. Specifically, an MTNN is used to compute the high-quality frame $\hat{x}_t^h$, where one model instance can accommodate multiple QP values. A binary MSM is used for each QP value to guide the inference computation of the MTNN for that QP value.

The proposed MQLF can be used in combination with one or multiple of the previously mentioned additional components (i.e., DF, SAO, ALF, CCALF, etc.) to improve the visual quality of the reconstructed frame $\hat{x}_t$. For example, the reconstructed frame $\hat{x}_t$ can go through DF first, followed by the MQLF, further followed by SAO and ALF. The order of how these components are used can change arbitrarily. In one example embodiment, the proposed method can also be used alone as a replacement of all the other components to enhance the visual quality of the reconstructed frame $\hat{x}_t$.

The MQLF may be used for both Slice/CU level on each of the frames, in combination with one or multiple of the above mentioned additional components (e.g., DF, SAO, ALF, CCALF, etc.). In other words, the reconstructed frame $\hat{x}_t$ can be one entire frame, such as the I frame if applied with Slice switch On, indicating the hierarchical level 0 frames. Also, the reconstructed frame $\hat{x}_t$ can be a block in a frame, e.g., a CTU if applied with the CTU switch On, indicating lower level frames of the hierarchical structure. There are no restrictions on the specific video compression methods (e.g., HEVC, VVC) that compute the reconstructed frame $\hat{x}_t$.

Figure 3:
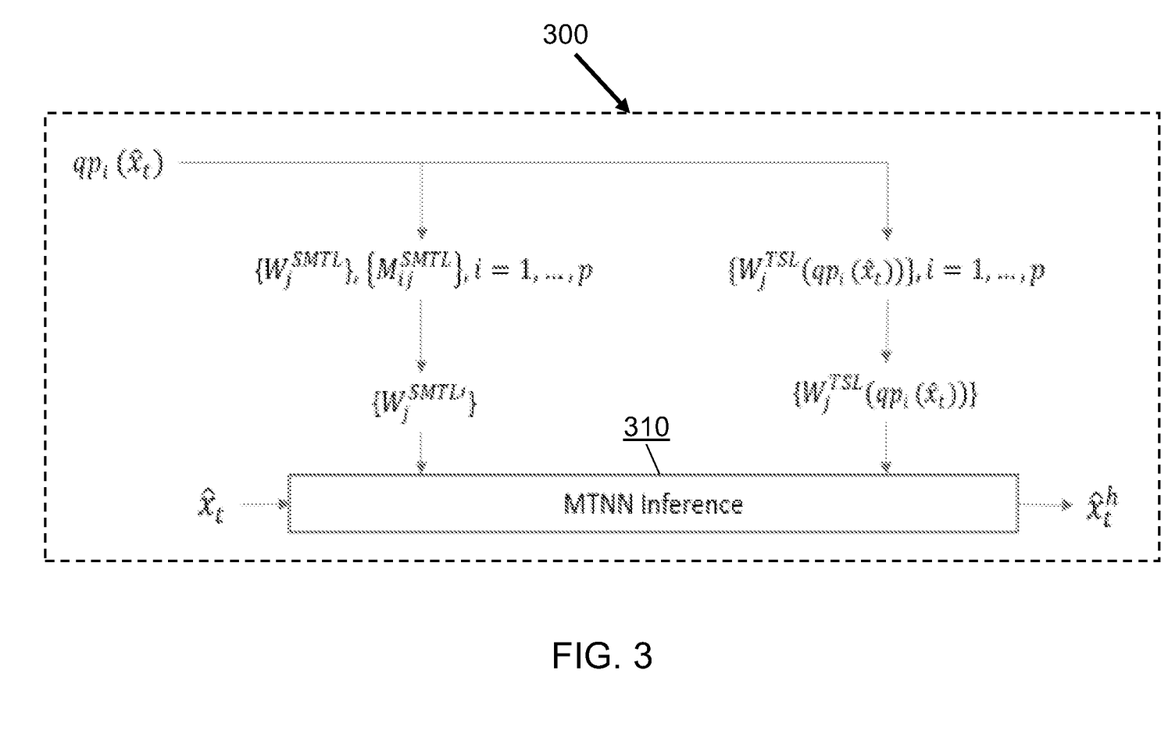
FIG. 3 is a block diagram of an inference of a Multi-Task Neural Network (MTNN) for a Multi-Quality Loop Filter (MQLF) method of video compression using micro-structured masks, during a test stage, according to embodiments.

FIG. 3 is a block diagram of an inference of a Multi-Task Neural Network (MTNN) by micro-structured parameter sharing for a Multi-Quality Loop Filter (MQLF) apparatus 300, during a test stage, according to embodiments.

As shown in FIG. 3, the test apparatus 300 includes a MTNN Inference module 310.

Given an input $\hat{x}_t$ of size (h, w, c), where h, w, c are the height, width, and number of channels, respectively, a test stage of the inference workflow of the MQLF can be described as follows.

The MQLF uses an MTNN that may be separated into two parts: a set of Shared Multi-Task Layers (SMTL) and a set of Task-Specific Layers (TSL). The model parameters of the SMTL are shared across (i.e., the same for) different QP values. The model parameters of the TSL are for each QP value individually. Assume that there are p QP values $qp_1, \ldots, qp_p$, ranked in an order, preferably in a descending order corresponding to reconstruction qualities of the input frame $\hat{x}_t$ from low to high). Let $\{W_j^{SMTL}\}$ denote a set of weight parameters of the SMTL, where each $W_j^{SMTL}$ is the weight parameters of the j-th layer. Let $\{M_{ij}^{SMTL}\}$ denote a set of binary masks corresponding to the QP value $qp_i$, where each binary mask $M_{ij}^{SMTL}$ has the same shape as the weight parameter $W_j^{SMTL}$ of the j-th layer. Each entry of the binary mask $M_{ij}^{SMTL}$ is 1 or 0 indicating whether or not the corresponding weight entry in the weight parameter $W_j^{SMTL}$ participates in the inference computation for the QP value $qp_i$. Let $\{W_j^{TSL}(qp_i)\}$ denote a set of weight parameters of the TSL corresponding to the QP value $qp_i$, where $W_j^{TSL}(qp_i)$ is the weight parameters of the j-th layer. No restriction are put in on the type of layers (e.g., convolution, normalization, fully connected, etc.) and the position of the layers in SMTL and TSL. For example, layers of STML and TSL can be interlaced to form the MTNN.

Each of the weight parameters $W_j^{SMTL}$ or $W_j^{TSL}(qp_i)$ are a general 5-Dimension (5D) tensor with size $(c_1, k_1, k_2, k_3, c_2)$. The input of the corresponding layer is a 4-Dimension (4D) tensor A of size $(h_1, w_1, d_1, c_1)$, and the output is a 4D tensor B of size $(h_2, w_2, d_2, c_2)$. The sizes $c_1, k_1, k_2, k_3, c_2, h_1, w_1, d_1, h_2, w_2, d_2$ are integer numbers greater or equal to 1. When any of the sizes $c_1, k_1, k_2, k_3, c_2, h_1, w_1, d_1, h_2, w_2, d_2$ are equal to 1, the corresponding tensor reduces to a lower dimension. Each item in each tensor is a floating number. The parameters $h_1, w_1$ and $d_1$ are the height, weight and depth of the input A. Similarly, the parameters $h_2, w_2$ and $d_2$ are the height, weight and depth of the output B. The parameter $c_1$ is the number of input channels in the input A. Similarly, the parameter $c_2$ is the number of output channels in the output B. The parameters $k_1, k_2$ and $k_3$ are the size of the convolution kernel corresponding to the height, weight, and depth axes, respectively. The output B is computed through the convolution operation $\odot$ based on input A, weight parameters $W_j^{SMTL}$ or $W_j^{TSL}(qp_i)$ and masks $M_{ij}^{SMTL}$ if available. Note that for the weight parameters $W_j^{TSL}(qp_i)$, a mask $M_j^{TSL}(qp_i)$ may also be associated to it, and all entries of the masks $M_j^{TSL}(qp_i)$ are set to be 1. From this perspective, traditional methods of training an individual model instance for each individual QP value as an individual task can be seen as a special case of the proposed method in this disclosure, where the SMTL has no layers and masks while TSL has all the layers.

The output B may be obtained by convolving input A with the masked weights:

$$W_{ij}^{SMTL\prime}=W_j^{SMTL}\cdot M_{ij}^{MSTL} \quad \text{or} \quad W_j^{TSL\prime}(s_i)= W_j^{TSL}(s_i)\cdot M_j^{TSL}(s_i)=W_j^{TSL}(qp_i) \quad (1)$$

where · is element-wise multiplication.

Referring to FIG. 3, given the above learned weight parameters $\{W_j^{SMTL}\}$, $\{W_j^{TSL}(qp_i)\}$, i=1, ..., p, and masks $\{M_{ij}^{SMTL}\}$, i=1, ..., p, with the input $\hat{x}_t$ and the associated target QP value $qp_i(\hat{x}_t)$, the corresponding mask $\{M_{ij}^{SMTL}\}$ is used to generate the masked weight parameters $\{W_{ij}^{SMTL_i}\}$ for the SMTL and the corresponding subnetwork of the TSL for the QP value $qp_i(\hat{x}_t)$ is selected with weight parameters $W_j^{TSL}(qp_i(\hat{x}_t))$. Then, using the masked weight parameters $\{W_{ij}^{SMTL_i}\}$ for the SMTL inference and using the weight parameters $W_j^{TSL}(qp_i(\hat{x}_t))$ for the TSL inference, the MTNN Inference module 310 computes the inference output $\hat{x}_t^h$, which is the enhanced high-quality result.

The shape of each weight parameter $W_j^{SMTL}$ can be changed, corresponding to the convolution of a reshaped input with the reshaped $W_j^{SMTL}$ to obtain the same output. Similarly, the shape of each mask $M_{ij}^{SMTL}$ can also be changed. In embodiments, the shape of each weight parameter may take two configurations. First, the 5D weight tensor is reshaped into a 3D tensor of size $(c_1', c_2', k)$, where $c_1' \times c_2' \times k = c_1 \times c_2 \times k_1 \times k_2 \times k_3$. For example, a configuration is $c_1'=c_1, c_2'=c_2, k=k_1\times k_2\times k_3$. Second, the 5D weight tensor is reshaped into a 2D matrix of size $(c_1', c_2')$, where $c_1' \times c_2'=c_1 \times c_2 \times k_1 \times k_2 \times k_3$. For example, some configurations include $c_1'=c_1, c_2'=c_2\times k_1\times k_2\times k_3$, or $c_2'=c_2, c_1'=c_1\times k_1\times k_2\times k_3$.

The desired micro-structure of the masks are designed to align with the underlying GEMM matrix multiplication process of how the convolution operation is implemented so that the inference computation of using the masked weight parameters can be accelerated. In embodiments, block-wise micro-structures are used for the masks (i.e., the masked weight parameters) of each layer in the 3D reshaped weight tensor or the 2D reshaped weight matrix. Specifically, for the case of reshaped 3D weight tensor, the blocks are partitioned into blocks of size $(g_1', g_2', g_k)$. For the case of reshaped 2D weight matrix, the blocks are partitioned into blocks of size $(g_1', g_2')$. When any of the $g_1', g_2', g_k$ takes size 1, the corresponding block reduces to a lower dimension. All items in a block of a mask have the same binary value, 1 or 0. That is, weight parameters are masked out in block-wise micro-structured fashion.

Figure 4:
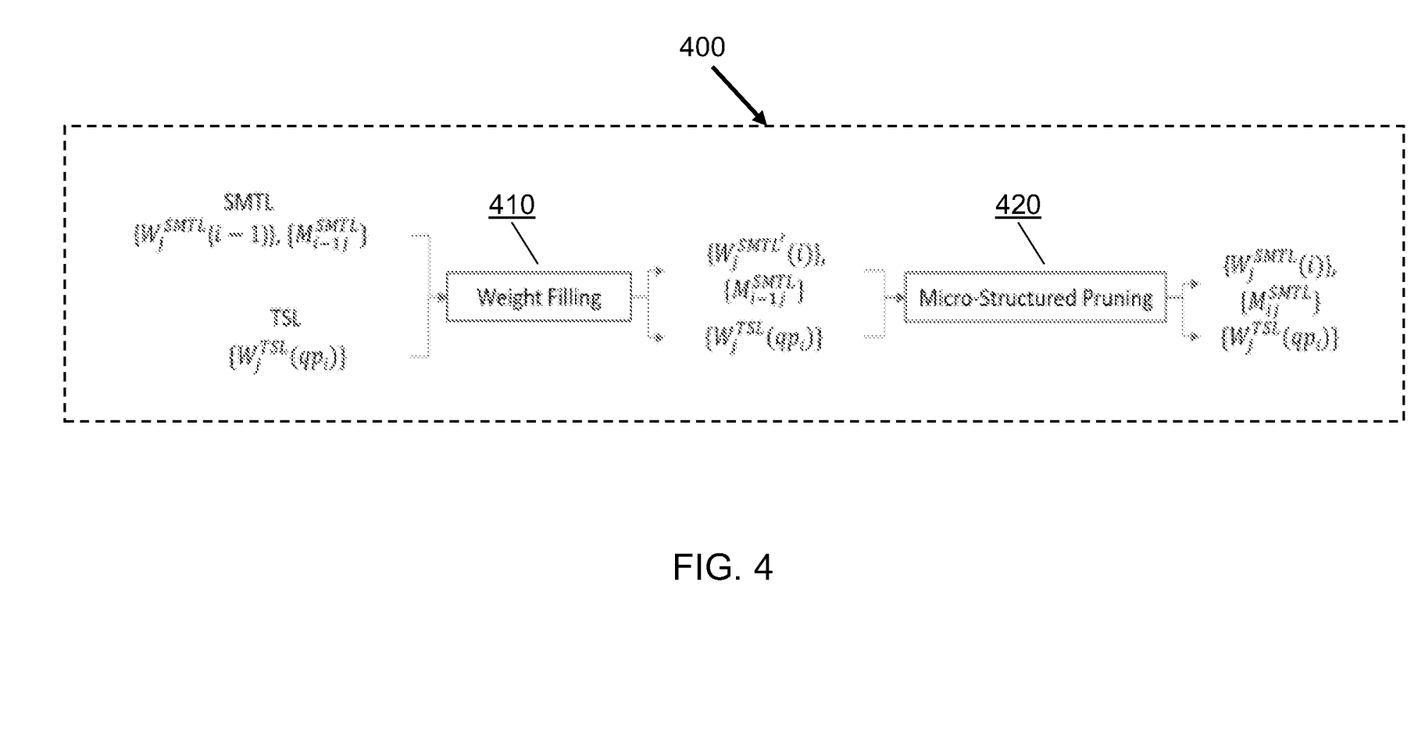
FIG. 4 is a block diagram of a training apparatus for multi-task neural network video compression using micro-structured masks, during a training stage, according to embodiments.

The training process of the NN model according to embodiments will now be described. An overall workflow of the proposed multi-stage training framework is shown in FIG. 4. The goal of the training stage is to learn the MTNN model instance with weight parameters $\{W_j^{SMTL}\}$ and $\{W_j^{TSL}(qp_i)\}$ and the set of micro-structured masks $\{M_{ij}^{SMTL}\}$ for $i=1, \ldots, p$, each mask $\{M_{ij}^{SMTL}\}$ and weight parameters $\{W_j^{TSL}(qp_i)\}$ targeting at each QP value of the interest QP value $qp_i$. A progressive multi-stage training framework may be used to achieve this goal.

FIG. 4 is a block diagram of a training apparatus 400 for multi-task neural network video compression by micro-structured masks, during a training stage, according to embodiments.

As shown in FIG. 4, the training apparatus 400 includes a Weight Filling module 410 and a Micro-Structured Pruning module 420.

Assume that a current task is to train the masks targeting the QP value $qp_i$, a current model instance having weights $\{W_j^{SMTL}(i-1)\}$, and the corresponding masks $\{M_{i-1j}^{SMTL}\}$. Also, the current QP value $qp_i$ have their corresponding TSL with weight parameters $\{W_j^{TSL}(qp_i)\}$ to learn. In other words, the goal is to obtain masks $\{M_{ij}^{SMTL}\}$ and the updated weight parameters $\{W_j^{SMTL}(i)\}$ and the new weight parameters $\{W_j^{TSL}(qp_i)\}$.

First, the weight parameters $\{W_j^{SMTL}(i-1)\}$ that are masked by masks $\{M_{i-1j}^{SMTL}\}$ are fixed. For Example, the weight parameters whose corresponding mask entry $M_{i-1j}^{SMTL}$ is 1. Then, a learning process is conducted through the Weight Filling module 410 to fill up the remaining unfixed weights in $\{W_j^{SMTL}(i-1)\}$ for the SMTL and the weights $\{W_j^{TSL}(qp_i)\}$ for the TSL. This results in a set of updated weight parameters $\{W_j^{SMTL_i}(i)\}$ and $\{W_j^{TSL}(qp_i)\}$.

Then, the Micro-Structured Pruning module 420 conducts micro-structured pruning, based on the set of updated weight parameters $\{W_j^{SMTL_i}(i)\}$, masks $\{M_{i-1j}^{SMTL}\}$, and $\{W_j^{TSL}(s_i)\}$, to obtain the pruned model instance and masks $\{W_j^{SMTL}(i)\}$, $\{M_{ij}^{SMTL}\}$, and $\{W_j^{TSL}(qp_i)\}$.

Figure 5:
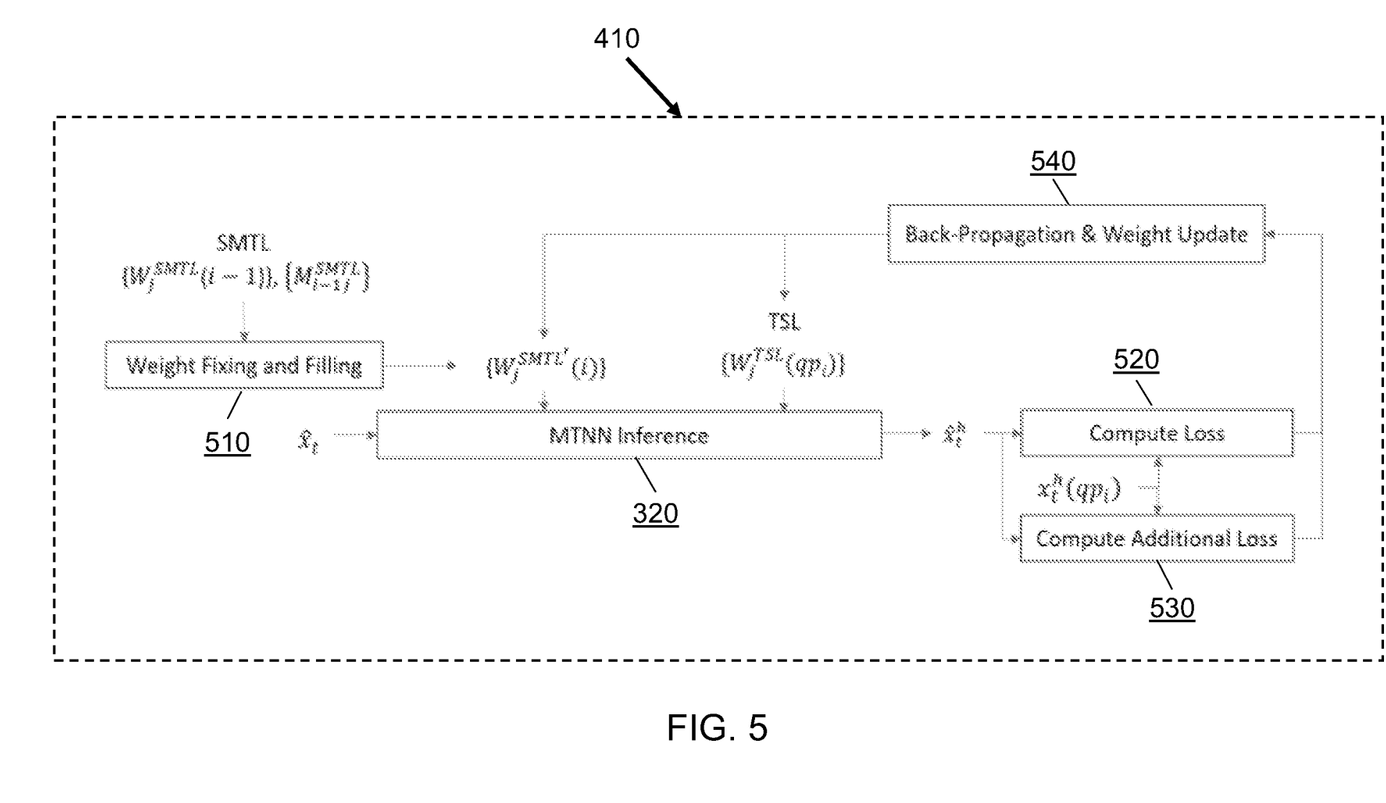
FIG. 5 is a detailed block diagram of the Weight Filling module from the training apparatus in FIG. 4, during a training stage, according to embodiments.

FIG. 5 is a workflow of the Weight Filling module 410 of FIG. 4, during a training stage, according to embodiments.

As shown in FIG. 5, the Weight Filling module 410 includes the MTNN Inference module 320, a Weight Fixing and Filling module 510, a Compute Loss module 520, a Compute Additional Loss module 530, and a Back-Propagation & Weight Update module 540.

Given the current weights $\{W_j^{SMTL}(i-1)\}$ and the corresponding masks $\{M_{i-1j}^{SMTL}\}$, weight parameters in $\{W_j^{SMTL}(i-1)\}$ that are masked by $\{M_{i-1j}^{SMTL}\}$ are fixed in the Weight Fixing and Filling module 510. Then, the remaining weight parameters in $\{W_j^{SMTL}(i-1)\}$ are reinitialized. For example, this may be done by setting them to some random initial values or using the corresponding weights of a previously learned full model such as the first full model with weights $\{W_j^{SMTL_i}(0)\}$. This gives the weight parameters $\{W_j^{SMTL_i}(i)\}$ for the SMTL. The weight parameters $\{W_j^{TSL}(qp_i)\}$ of the TSL are also initialized (e.g., by setting them to some random initial values or using the corresponding weights of some previously learned full model such as an individual full model trained for the current QP value $qp_i$). After that, the training input $\hat{x}_t$ is passed through the MTNN to compute the output $\hat{x}_t^h$ in the MTNN Inference module 320 using weight parameter $\{W_j^{SMTL_i}(i)\}$ for the STML inference and the weight parameter $\{W_j^{TSL}(qp_i)\}$ for the TSL inference.

For training purposes, each training input $\hat{x}_t$ has a corresponding ground-truth $x_t^h(qp_i)$ for the QP value $qp_i$. For example, the training input $\hat{x}_t$ is reconstructed from the compressed version of the ground-truth $x_t^h(qp_i)$ with a video compression method using the QP value $qp_i$. The general goal of training is to minimize the distortion between the ground-truth $x_t^h(qp_i)$ and the estimated output $\hat{x}_t^h$. The Compute Loss module 520 computes a distortion loss $L(x_t^h(qp_i), \hat{x}_t^h)$ to measure the distortion, such as the MSE or SSIM, between the ground-truth $x_t^h(qp_i)$ and the estimated output $\hat{x}_t^h$. In some example embodiments, the Compute Additional Loss module 530 may compute other losses to help regularize the training process. For example, a perceptual loss can be used, where by passing either the ground-truth $x_t^h(qp_i)$ or estimated output $\hat{x}_t^h$ as inputs into a feature extraction NN like VGG, a feature map can be computed, and the difference between the feature maps computed by ground-truth $x_t^h(qp_i)$ and the estimated output $\hat{x}_t^h$ are measured, weighted and combined with the distortion loss $L(x_t^h(qp_i), \hat{x}_t^h)$. Also, an adversarial loss may be used, where a discriminator tries to classify whether the ground-truth $x_t^h(qp_i)$ or the estimated output $\hat{x}_t^h$ is an original input or a generated input by the MTNN. The classification loss can be used as the adversarial loss, weighted and combined with the distortion loss $L(x_t^h(qp_i), \hat{x}_t^h)$. The Back-Propagation & Weight Update module 540 computes the gradient of this combined loss (or $L(x_t^h(qp_i), \hat{x}_t^h)$ if no other loss is used) and updates the unfixed weight parameters $\{W_j^{SMTL_i}(i)\}$ of the SMTL and the weight parameters $\{W_j^{TSL}(qp_i)\}$ of the TSL. Multiple iterations may be taken in this Back-Propagation & Weight Update module 540 (e.g., until reaching a maximum iteration number or until the loss converges).

Figure 6:
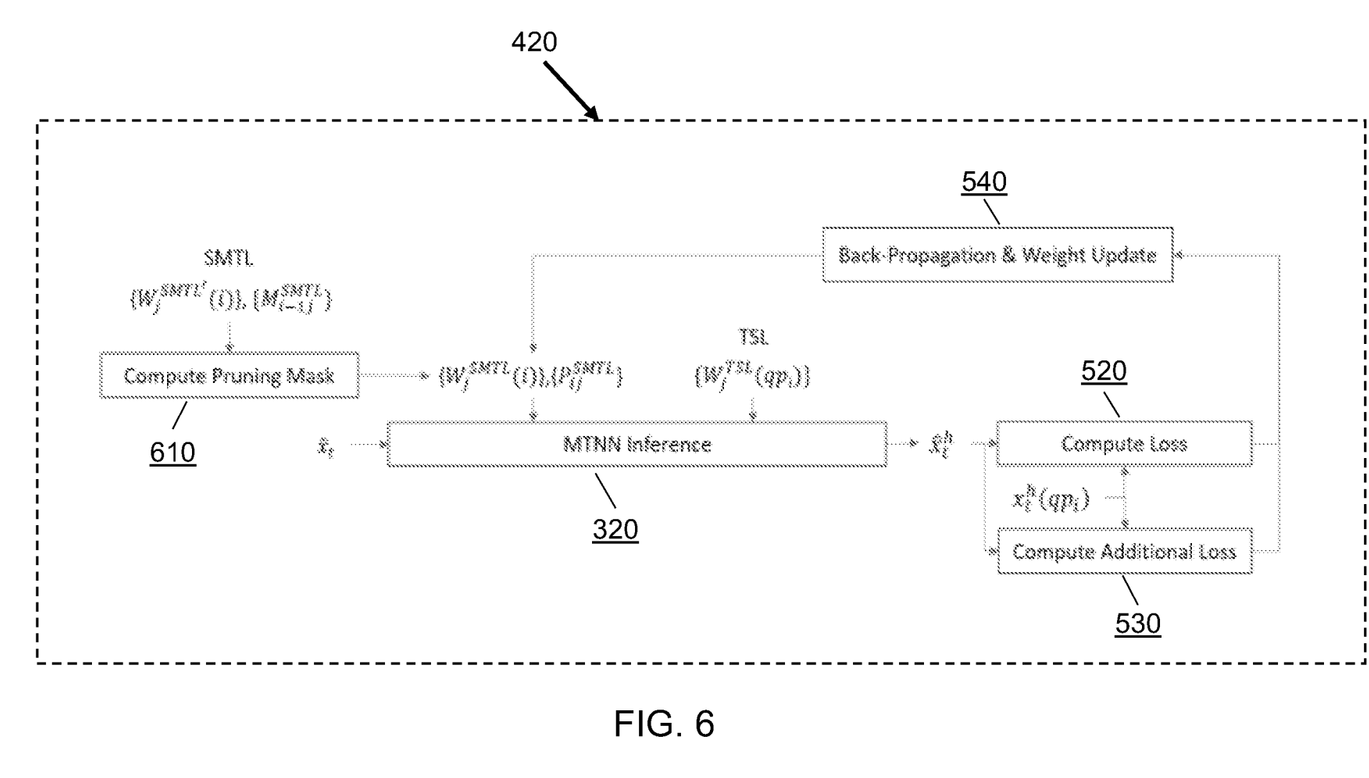
FIG. 6 is a detailed block diagram of the Micro-Structured Pruning module from the training apparatus in FIG. 4, during a training stage, according to embodiments.

FIG. 6 is a detailed workflow of the Micro-Structured Pruning module 420 of FIG. 4, during a training stage, according to embodiments.

As shown in FIG. 6, the Micro-Structured Pruning module 420 includes the MTNN Inference module 320, the Compute Loss module 520, the Compute Additional Loss module 530, the Back-Propagation & Weight Update module 540, and a Compute Pruning Mask module 610.

First, given the updated weights $\{W_j^{SMTL}{}'(i)\}$ of the SMTL and the weights $\{W_j^{TSL}(qp_i)\}$ of the TSL from the Weight Filling module 410, as well as the current masks $\{M_{i-1,j}^{SMTL}\}$, the Compute Pruning Mask module 610 computes the pruning masks. In detail, the updated weight parameters $\{W_j^{SMTL}{}'(i)\}$ that are masked by $\{M_{i-1,j}^{SMTL}\}$, and for the remaining unfixed weight parameters in $\{W_j^{SMTL}{}'(i)\}$, are fixed and a pruning loss $L_p(b)$ (e.g., the $L_1$ or $L_2$ norm of the weights in the block) is computed for each micro-structured block b as mentioned before. The Compute Pruning Mask module 610 ranks the micro-structured blocks based on their pruning loss $L_p(b)$ in ascending order and the blocks are pruned (i.e., by setting the corresponding weights in the pruned blocks as 0) top down from the ranked list until a stop criterion is reached. For example, given a validation dataset $S_{val}$, the MTNN model with weights $\{W_j^{SMTL}{}'(i)\}$ and $\{W_j^{TSL}(qp_i)\}$ generates a distortion loss $L_{val}$ as:

$$L_{val} = \Sigma_{x_t^h(qp_i) \in S_{val}} L(x_t^h(qp_i), \hat{x}_t^h) \qquad (2)$$

As more and more micro-blocks are pruned, this distortion loss $L_{val}$ gradually increases. The stop criterion can be a tolerable percentage threshold that allows the distortion loss $L_{val}$ to increase. The stop criterion can also be a simple percentage (e.g., 50%) of the micro-structured blocks to be pruned. A set of binary pruning masks $\{P_{ij}^{SMTL}\}$ can be generated, where an entry in a pruning mask $P_{ij}^{SMTL}$ is 1 means the corresponding weight parameter in $W_j^{SMTL}{}'(i)$ is pruned. Then, in the Back-Propagation & Weight Update module 540, the additional unfixed weights in the weights $W_j^{SMTL}{}'(i)$ that are masked by masks $\{P_{ij}^{SMTL}\}$ as being pruned are fixed, and the remaining weights $W_j^{SMTL}{}'(i)$ that are not masked by either pruning masks $\{P_{ij}^{SMTL}\}$ or $\{M_{i-1,j}^{SMTL}\}$ are updated, and the weights $\{W_j^{TSL}(qp_i)\}$ are updated, by regular back-propagation to optimize the combined loss (or the distortion loss $L(x_t^h(qp_i), \hat{x}_t^h)$ if no other loss are used) over the training data. Multiple iterations may be taken, e.g., until reaching a maximum number of iterations or until the loss converges.

The corresponding masks $\{M_{ij}^{SMTL}\}$ can be computed as:

$$M_{ij}^{SMTL} = M_{i-1,j}^{SMTL} \cup \overline{P_{ij}^{SMTL}} \qquad (3)$$

That is, the non-pruned entries in $P_{ij}^{SMTL}$ that are not masked in $M_{i-1,j}^{SMTL}$ are additionally set to 1 as being masked in $M_{ij}^{SMTL}$. Also, the above micro-structured weight pruning process outputs the updated weights $\{W_j^{SMTL}(i)\}$ and $\{W_j^{TSL}(qp_i)\}$. Note that the above micro-structured pruning process can also be, optionally, applied to weights $\{W_j^{TSL}(qp_i)\}$ to further reduce the model size and inference computation. That is, the Compute Pruning Mask module 610 can also reshape and partition weights of the TSL into micro-structures, compute the pruning loss of those micro-structures, and prune top ranked micro-structures with small pruning loss. It may also optionally choose to do so to balance the MTNN reconstruction quality and storage and computation.

Finally, the last updated weights $\{W_j^{SMTL}(N)\}$ are the final output weights $\{W_j^{SMTL}\}$ for the SMTL of the learned MTNN model instance for the MQLF.

Figure 7:
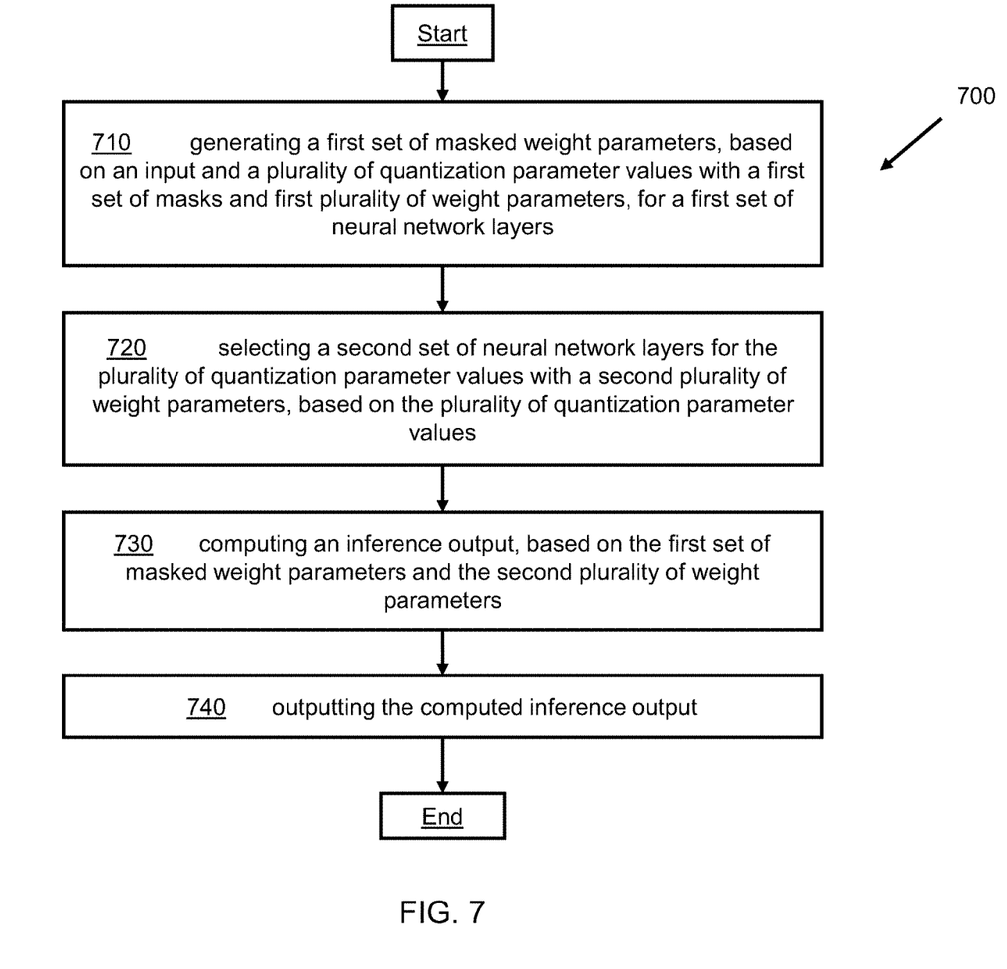
FIG. 7 is a flowchart of a method for video compression with a MQLF using a MTNN, with shared multi-task layers, task-specific layers and micro-structured masks, according to embodiments.

FIG. 7 is a flowchart of a method 700 for video compression with a MQLF using a MTNN, with shared multi-task layers, task-specific layers, and micro-structured masks, according to embodiments.

In some implementations, one or more process blocks of FIG. 7 may be performed by the platform 120. In some implementations, one or more process blocks of FIG. 7 may be performed by another device or a group of devices separate from or including the platform 120, such as the user device 110.

As shown in FIG. 7, in operation 710, the method 700 includes generating a first set of masked weight parameters, based on an input and a plurality of quantization parameter values with a first set of masks and first plurality of weight parameters, for a first set of layers of a neural network. Each mask in the first set of masks may be a binary value indicating if a corresponding one of the first plurality of weight parameters is used to compute the inference output. Additionally, the first set of masked weight parameters may be obtained by performing convolution of the first plurality of weight parameters and the first set of masks.

In operation 720, the method 700 includes selecting a second set of layers of the neural network for the plurality of quantization parameter values with a second plurality of weight parameters, based on the plurality of quantization parameter values. A second set of masks corresponding to the second plurality of weight parameters may also be selected.

In operation 730, the method 700 includes computing an inference output, based on the first set of masked weight parameters and the second plurality of weight parameters In operation 740, the method 700 includes outputting the computed inference output.

Although FIG. 7 shows example blocks of the method, in some implementations, the method may include additional blocks, fewer blocks, different blocks, or differently arranged blocks than those depicted in FIG. 7. Additionally, or alternatively, two or more of the blocks of the method may be performed in parallel.

For example, operations of the method 700 may include splitting a neural network into the first set of layers of a neural network and the second set of layers of the neural network. The model parameters of the first set of layers of the neural network may be shared layers that are shared across different quantization parameter values with a corresponding one of the first plurality of weight parameters for each of the shared layers. The model parameters of the second set of layers of the neural network may be task specific layers that are different for each of the quantization parameter values with a corresponding one of the second plurality of weight parameters for each of the task specific layers.

The neural network is trained by updating one or more of the first plurality of weight parameters that are not respectively masked by the first set of masks, to minimize a distortion loss that is determined based on the input, the inference output and a respective quantization parameter value. Further, the neural network is trained by pruning the updated one or more of the first plurality of weight parameters not respectively masked by the first set of masks to obtain binary pruning masks indicating which of the first plurality of weight parameters are pruned, and updating at least one of the first plurality of weight parameters that are not respectively masked by the first set of masks and the obtained binary pruning masks, to minimize the distortion loss.

Figure 8:
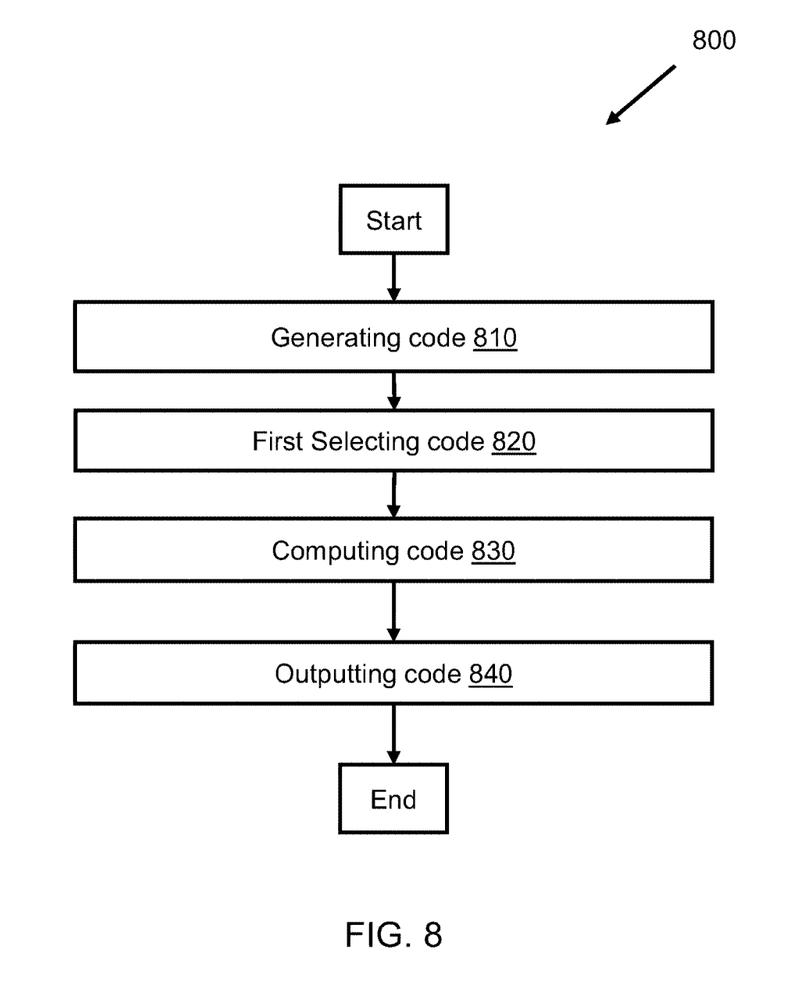
FIG. 8 is a block diagram of an apparatus for video compression with a MQLF using a MTNN, with shared multi-task layers, task-specific layers and micro-structured masks, according to embodiments.

FIG. 8 is a block diagram of an apparatus 800 for video compression with a MQLF using a MTNN, with shared multi-task layers, task-specific layers and micro-structured masks, according to embodiments.

As shown in FIG. 8, the apparatus 800 includes generating code 810, first selecting code 820, and computing code 830.

The generating code 810 configured to cause the at least one processor to generate a first set of masked weight parameters, based on an input and a plurality of quantization parameter values with a first set of masks and first plurality of weight parameters, for a first set of layers of the neural network. Each mask in the first set of masks may be a binary value indicating if a corresponding one of the first plurality of weight parameters is used to compute the inference output.

The first selecting code 820 configured to cause the at least one processor to select a second set of layers of the neural network for the plurality of quantization parameter values with a second plurality of weight parameters, based on the plurality of quantization parameter values.

The computing code 830 configured to cause the at least one processor to compute an inference output, based on the first set of masked weight parameters and the second plurality of weight parameters.

The outputting code 840 configured to cause the at least one processor to output the computed inference output.

Although FIG. 8 shows example blocks of the apparatus, in some implementations, the apparatus may include additional blocks, fewer blocks, different blocks, or differently arranged blocks than those depicted in FIG. 8. Additionally, or alternatively, two or more of the blocks of the apparatus may be combined.

For example, the apparatus 800 may include splitting code configured to cause the at least one processor to split a neural network into the first set of layers of the neural network and the second set of layers of the neural network, wherein model parameters of the first set of layers of the neural network are shared layers that are shared across different quantization parameter values with a corresponding one of the first plurality of weight parameters for each of the shared layers, and model parameters of the second set of layers of the neural network are task specific layers that are different for each of the quantization parameter values with a corresponding one of the second plurality of weight parameters for each of the task specific layers.

The neural network may be trained by updating one or more of the first plurality of weight parameters that are not respectively masked by the first set of masks, to minimize a distortion loss that is determined based on the input, the inference output and a respective quantization parameter value, pruning the updated one or more of the first plurality of weight parameters not respectively masked by the first set of masks to obtain binary pruning masks indicating which of the first plurality of weight parameters are pruned, and updating at least one of the first plurality of weight parameters that are not respectively masked by the first set of masks and the obtained binary pruning masks, to minimize the distortion loss.

Further, apparatus 800 may include second selecting code configured to cause the at least one processor to select a second set of masks corresponding to the second plurality of weight parameters and performing code configured to cause the at least one processor to perform convolution of the first plurality of weight parameters and the first set of masks to obtain the first set of masked weight parameters.

Compared with the traditional loop filtering or NN-based loop filtering methods, embodiments describe using one MTNN model instance to accommodate the compression of multiple QP values by using multiple binary masks. The block-wise micro-structured masks also preserve the compression performance of individual QP values and can reduce inference computation. This method largely reduces deployment storage for compression using multiple QP values. It also provides a flexible and general framework that accommodates various types of underlying NNLF methods and model architectures and various shaped micro-structures.

The proposed methods may be used separately or combined in any order. Further, each of the methods (or embodiments) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of processing a video with a multi-quality loop filter using a multi-task neural network, the method being performed by at least one processor, and the method comprising:

generating a first set of masked weight parameters, based on an input and a plurality of quantization parameter values with a first set of masks and first plurality of weight parameters, for a first set of layers of a neural network;
selecting a second set of layers of the neural network for the plurality of quantization parameter values with a second plurality of weight parameters, based on the plurality of quantization parameter values;
computing an inference output, based on the first set of masked weight parameters and the second plurality of weight parameters; and
outputting the computed inference output,
wherein the neural network is trained by updating one or more of the first plurality of weight parameters that are not respectively masked by the first set of masks, to minimize a distortion loss that is determined based on the input, the inference output and a respective quantization parameter value, and
wherein the neural network is further trained by:
pruning the updated one or more of the first plurality of weight parameters not respectively masked by the first set of masks to obtain binary pruning masks indicating which of the first plurality of weight parameters are pruned; and
updating at least one of the first plurality of weight parameters that are not respectively masked by the first set of masks and the obtained binary pruning masks, to minimize the distortion loss.

2. The method of claim 1, further comprising splitting the neural network into the first set of layers of the neural network and the second set of layers of the neural network,
wherein model parameters of the first set of layers of the neural network are shared layers that are shared across different quantization parameter values with a corresponding one of the first plurality of weight parameters for each of the shared layers, and
wherein model parameters of the second set of layers of the neural network are task specific layers that are different for each of the quantization parameter values with a corresponding one of the second plurality of weight parameters for each of the task specific layers.

3. The method of claim 1, wherein each mask in the first set of masks is a binary value indicating if a corresponding one of the first plurality of weight parameters is used to compute the inference output.

4. The method of claim 1, further comprising selecting a second set of masks corresponding to the second plurality of weight parameters.

5. The method of claim 1, further comprising performing convolution of the first plurality of weight parameters and the first set of masks to obtain the first set of masked weight parameters.

6. An apparatus for processing a video with a multi-quality loop filter using a multi-task neural network, the apparatus comprising:
at least one memory configured to store program code; and
at least one processor configured to read the program code and operate as instructed by the program code, the program code comprising:
generating code configured to cause the at least one processor to generate a first set of masked weight parameters, based on an input and a plurality of quantization parameter values with a first set of masks and first plurality of weight parameters, for a first set of layers of a neural network;
first selecting code configured to cause the at least one processor to select a second set of layers of the neural network for the plurality of quantization parameter values with a second plurality of weight parameters, based on the plurality of quantization parameter values;
computing code configured to cause the at least one processor to compute an inference output, based on the first set of masked weight parameters and the second plurality of weight parameters; and
outputting code configured to cause the at least one processor to output the computed inference output,
wherein the neural network is trained by updating one or more of the first plurality of weight parameters that are not respectively masked by the first set of masks, to minimize a distortion loss that is determined based on the input, the inference output and a respective quantization parameter value, and
wherein the neural network is further trained by:
pruning the updated one or more of the first plurality of weight parameters not respectively masked by the first set of masks to obtain binary pruning masks indicating which of the first plurality of weight parameters are pruned; and
updating at least one of the first plurality of weight parameters that are not respectively masked by the first set of masks and the obtained binary pruning masks, to minimize the distortion loss.

7. The apparatus of claim 6, wherein the program code further comprises splitting code configured to cause the at least one processor to split the neural network into the first set of layers of the neural network and the second set of layers of the neural network,
wherein model parameters of the first set of layers of the neural network are shared layers that are shared across different quantization parameter values with a corresponding one of the first plurality of weight parameters for each of the shared layers, and
wherein model parameters of the second set of layers of the neural network are task specific layers that are different for each of the quantization parameter values with a corresponding one of the second plurality of weight parameters for each of the task specific layers.

8. The apparatus of claim 6, wherein each mask in the first set of masks is a binary value indicating if a corresponding one of the first plurality of weight parameters is used to compute the inference output.

9. The apparatus of claim 6, further comprising second selecting code configured to cause the at least one processor to select a second set of masks corresponding to the second plurality of weight parameters.

10. The apparatus of claim 6, further comprising performing code configured to cause the at least one processor to perform convolution of the first plurality of weight parameters and the first set of masks to obtain the first set of masked weight parameters.

11. A non-transitory computer-readable medium storing instructions that, when executed by at least one processor for processing a video with a multi-quality loop filter using a multi-task neural network, cause the at least one processor to:
generate a first set of masked weight parameters, based on an input and a plurality of quantization parameter values with a first set of masks and first plurality of weight parameters, for a first set of layers of a neural network;
select a second set of layers of the neural network for the plurality of quantization parameter values with a second plurality of weight parameters, based on the plurality of quantization parameter values;

compute an inference output, based on the first set of masked weight parameters and the second plurality of weight parameters; and output the computed inference output, wherein the neural network is trained by updating one or more of the first plurality of weight parameters that are not respectively masked by the first set of masks, to minimize a distortion loss that is determined based on the input, the inference output and a respective quantization parameter value, and wherein the neural network is further trained by:
  pruning the updated one or more of the first plurality of weight parameters not respectively masked by the first set of masks to obtain binary pruning masks indicating which of the first plurality of weight parameters are pruned; and
  updating at least one of the first plurality of weight parameters that are not respectively masked by the first set of masks and the obtained binary pruning masks, to minimize the distortion loss.

12. The non-transitory computer-readable medium of claim 11, wherein the instructions, when executed by the at least one processor, further cause the at least one processor to split the neural network into the first set of layers of the neural network and the second set of layers of the neural network, wherein model parameters of the first set of layers of the neural network are shared layers that are shared across different quantization parameter values with a corresponding one of the first plurality of weight parameters for each of the shared layers, and wherein model parameters of the second set of layers of the neural network are task specific layers that are different for each of the quantization parameter values with a corresponding one of the second plurality of weight parameters for each of the task specific layers.

13. The non-transitory computer-readable medium of claim 11, wherein each mask in the first set of masks is a binary value indicating if a corresponding one of the first plurality of weight parameters is used to compute the inference output.

14. The non-transitory computer-readable medium of claim 11, wherein the instructions, when executed by the at least one processor, further cause the at least one processor to select a second set of masks corresponding to the second plurality of weight parameters.

15. The non-transitory computer-readable medium of claim 11, wherein the instructions, when executed by the at least one processor, further cause the at least one processor to perform convolution of the first plurality of weight parameters and the first set of masks to obtain the first set of masked weight parameters.

* * * * *